United States Patent
Bauer et al.

[11] 3,713,087
[45] Jan. 23, 1973

[54] ACOUSTICAL DIRECTION DETECTOR

[75] Inventors: Benjamin B. Bauer, Stamford; Edward J. Foster, Ridgefield, both of Conn.

[73] Assignee: Columbia Broadcasting System, Inc.

[22] Filed: Nov. 3, 1970

[21] Appl. No.: 86,447

[52] U.S. Cl. ................................340/16 R, 340/6 R
[51] Int. Cl. ...................................................G01s 3/00
[58] Field of Search......340/6 R, 16 R, 16 C; 343/119

[56] References Cited

UNITED STATES PATENTS

| | | | |
|---|---|---|---|
| 2,987,700 | 6/1961 | Hawkins | 340/6 R |
| 2,324,548 | 7/1943 | Wheeler | 343/119 X |
| 2,529,658 | 11/1950 | Massa | 340/16 C |

Primary Examiner—Richard A. Farley
Attorney—Spencer E. Olson and Martin M. Novack

[57] ABSTRACT

An acoustical detection apparatus for determining the direction of origin of sounds. A first acoustic receiving system having a relatively high uniform sensitivity in a predetermined plane and a relatively low sensitivity in and about the direction perpendicular to the plane is provided. A second acoustic receiving system having a spherical sensitivity pattern is also provided. The sensitivity of the second system is set substantially equal to the sensitivity of the first system in the predetermined plane. Means are provided for comparing the outputs of the first and second systems, the ratio of these outputs indicating the direction from which received sounds are arriving. In a preferred embodiment of the invention, the first acoustic receiving system has a donut-shaped reception characteristic.

4 Claims, 3 Drawing Figures

PATENTED JAN 23 1973

INVENTORS.
BENJAMIN B. BAUER
EDWARD J. FOSTER

BY M. Novack

ATTORNEY (BOTH PATTERNS ARE SOLIDS OF REVOLUTION ABOUT THE VERTICAL AXIS)

INVENTORS.
BENJAMIN B. BAUER
EDWARD J. FOSTER
BY
M. Novack
ATTORNEY 3,713,087

ACOUSTICAL DIRECTION DETECTOR

BACKGROUND OF THE INVENTION

The invention herein described was made in the course of or under a contract or subcontract thereunder with the Navy Department. This invention relates to acoustical detection apparatus and, more particularly, to an acoustical apparatus for distinguishing between sounds arriving in a generally horizontal direction, for example from a ground vehicle, and sounds arriving from an elevated source, such as an aircraft.

The accurate determination of the direction from which a sound is emanating is an objective in various applications and especially in military tactical applications. Previous acoustical detection systems which attempt to achieve this objective suffer from a variety of disadvantages, not the least of which is cost and complexity. It is an object of this invention to provide a relatively inexpensive acoustical detection apparatus which can produce accurate directional determinations with minimum equipment complexity.

SUMMARY OF THE INVENTION

The present invention is directed to an acoustical detection apparatus for determining the direction of origin of sounds. A first acoustic receiving system having a relatively high uniform sensitivity in a predetermined plane and a relatively low sensitivity in and about the direction perpendicular the plane is provided. A second acoustic receiving system having a spherical sensitivity pattern is also provided. The sensitivity of the second system is set substantially equal to the sensitivity of the first system in the predetermined plane. In addition, means are provided for comparing the outputs of the first and second systems. Sounds which arrive from within the predetermined plane, which can typically be chosen as the horizontal plane, elicit the same response from each acoustic system, and the output of the comparator accordingly indicates a null. For the same sounds from about the vertical direction, however, the first acoustic system produces relatively little output while the second acoustic system produces the same output as in the first case. A maximum indication from the comparator results. Sounds originating intermediate the horizontal and vertical (with respect to the location of the apparatus) produce intermediate indications in accordance with their direction of origin.

In the preferred embodiment of the invention, the first acoustic receiving system has a donut-shaped polar reception characteristic. An acoustic receiving system with such a characteristic is disclosed in the copending U.S. Pat. application Ser. No. 86,119, of B. Bauer entitled "Acoustical Receiving System", filed of even date herewith and assigned to the same assignee as the present invention.

Further features and advantages of the invention will become more readily apparent from the following detailed description when taken in conjunction with the accompanying drawings.

DESCRIPTION OF THE PREFERRED EMBODIMENT

Figure 1:
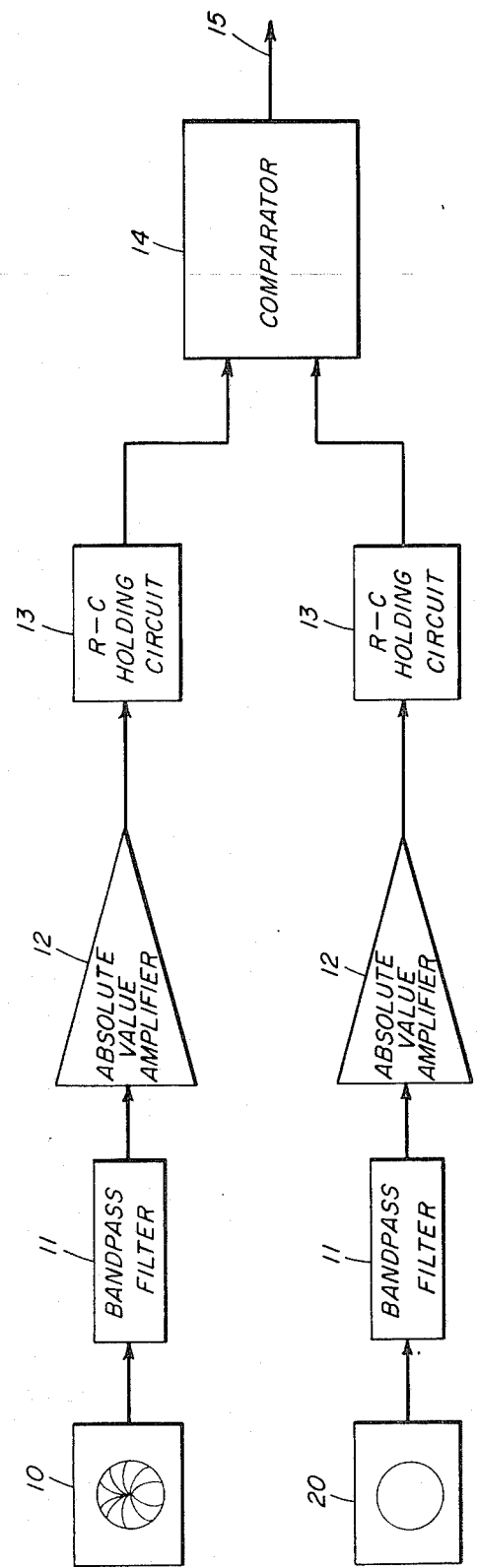
FIG. 1 is a block diagram of an acoustical direction detector in accordance with he invention.

Referring now to FIG. 1, there is shown an acoustical detection apparatus in accordance with the invention. A pair of acoustical receiving systems 10 and 20 are located in close proximity, typically near ground level. The receiving system 20 exhibits a uniform response in all directions and may be, for example, an omnidirectional pressure-type microphone of conventional design. The receiving system 10 exhibits a donut-shaped receiving pattern and has a uniform sensitivity in the horizontal plane which is set equal to the sensitivity of the receiving system 20. A suitable donut receiving system is disclosed in the above-referenced Bauer patent application and may consist, for example, of a pair of gradient microphones oriented perpendicularly with respect to each other and having their outputs added in phase quadrature.

Figure 2:
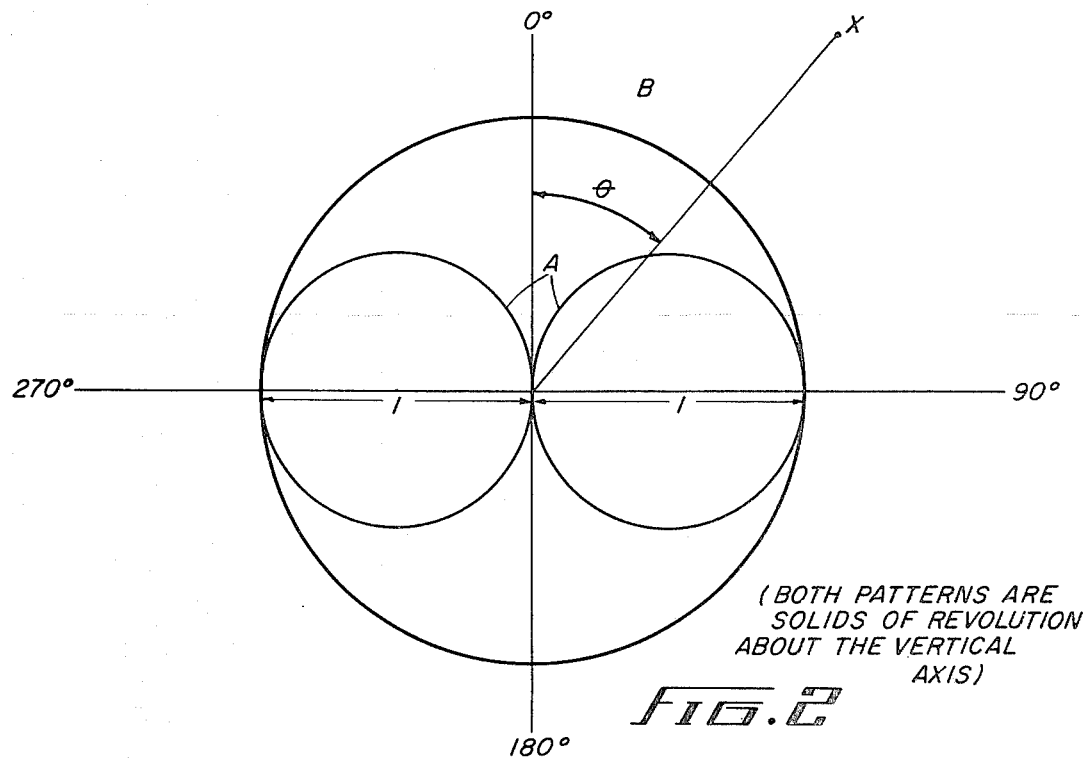
FIG. 2 is a polar plot of the receiving characteristics of two receiving systems utilized in the present invention.
Figure 3:
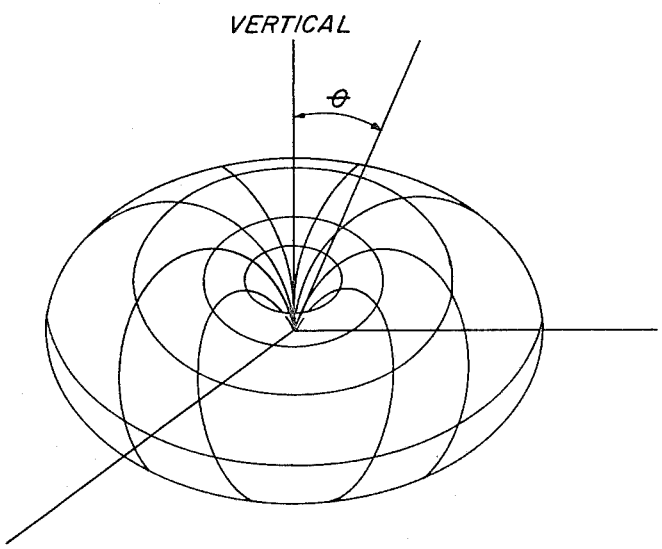
FIG. 3 is a three-dimensional representation of the polar receiving characteristics of a receiving system utilized in the present invention.

The idealized receiving patterns of the two acoustical receiving systems are depicted in FIG. 2 as sections of solids of revolution about a vertical axis (0° – 180°). The curve A represents the polar receiving pattern of the "donut" system 10. It is seen that the donut system has unit sensitivity in the horizontal plane (90° – 270°), and zero sensitivity in the vertical direction. The system 20 exhibits a spherical receiving pattern of unit sensitivity. The polar receiving pattern of the donut system 10 is further illustrated in FIG. 3, which is a three-dimensional representation.

The sensitivity of the donut receiving system 10 varies as $\sin \theta$ (FIG. 2), where $\theta$ is the angle at which a sound arrives with respect to the vertical. (For the idealized FIG. 2 the receiving systems are considered to be at the origin, but the vertical axis is actually taken at the center of the receiving systems.) Sounds originating in the horizontal plane ($\theta=90°$) elicit substantially equivalent responses from the two receiving systems as both have a unity response at this angle. For sounds arriving from their vertical direction ($\theta=0$) the response of the omnidirectional receiver 20 is again unity, while the response of the donut receiver is virtually zero. Generally, for sounds arriving from angles intermediate the horizontal and vertical, the ratio of the response of system 10 to the response of system 20 varies as $\sin \theta$. Using this relationship, the angle of arrival can be ascertained by comparing the outputs of the two receiving systems.

Referring again to FIG. 1, the outputs of the two receivers 10 and 20 are passed through bandpass filters 11 and then through "absolute value" amplifiers 12. The filters 11 have pass characteristics which are appropriate to the frequency of the sounds being sensed. The absolute value amplifiers provide full wave rectific-ation in addition to amplification. The output of each amplifier 12 is applied to an R-C circuit 13. The circuits 13 "hold" each signal for a time that is appropriate to insure that the comparison of the sound signals is made on the signal envelopes, rather than on instantaneous signal values. The outputs of the circuits 13 are applied to a comparator 14 which generates a signal 15 that is a measure of the ratio of the magnitudes of the two channel signals. The signal 15 is used to drive a meter or other appropriate indicator device.

We claim:

1. An acoustical detection apparatus for determining the direction of arrival of sounds, comprising:
    a first acoustic receiving system having a donut-shaped receiving characteristic, said first acoustic receiving system having a relatively high uniform sensitivity in a predetermined plane and a relatively low sensitivity in and about the direction perpendicular said plane;
    a second acoustic receiving system having a substantially spherical sensitivity pattern, the sensitivity of said second system being substantially equal to the uniform sensitivity of said first system in said predetermined plane; and
    means for comparing the outputs of said first and second systems to determine the direction of arrival of sounds.

2. An acoustical detection apparatus as defined by claim 1 wherein said second acoustic receiving system comprises a pressure type microphone.

3. An acoustical detection apparatus as defined by claim 2 wherein said predetermined plane is the horizontal plane.

4. An acoustical detection apparatus as defined by claim 1 wherein the output of said comparing means is a signal that varies as sin $\theta$, where $\theta$ is the angle of arrival of the sounds with respect to the direction perpendicular said plane.

* * * * *